(No Model.) 5 Sheets—Sheet 1.
W. H. PAINE.
GRIPPER FOR CABLE RAILWAYS.
No. 371,095. Patented Oct. 4, 1887.
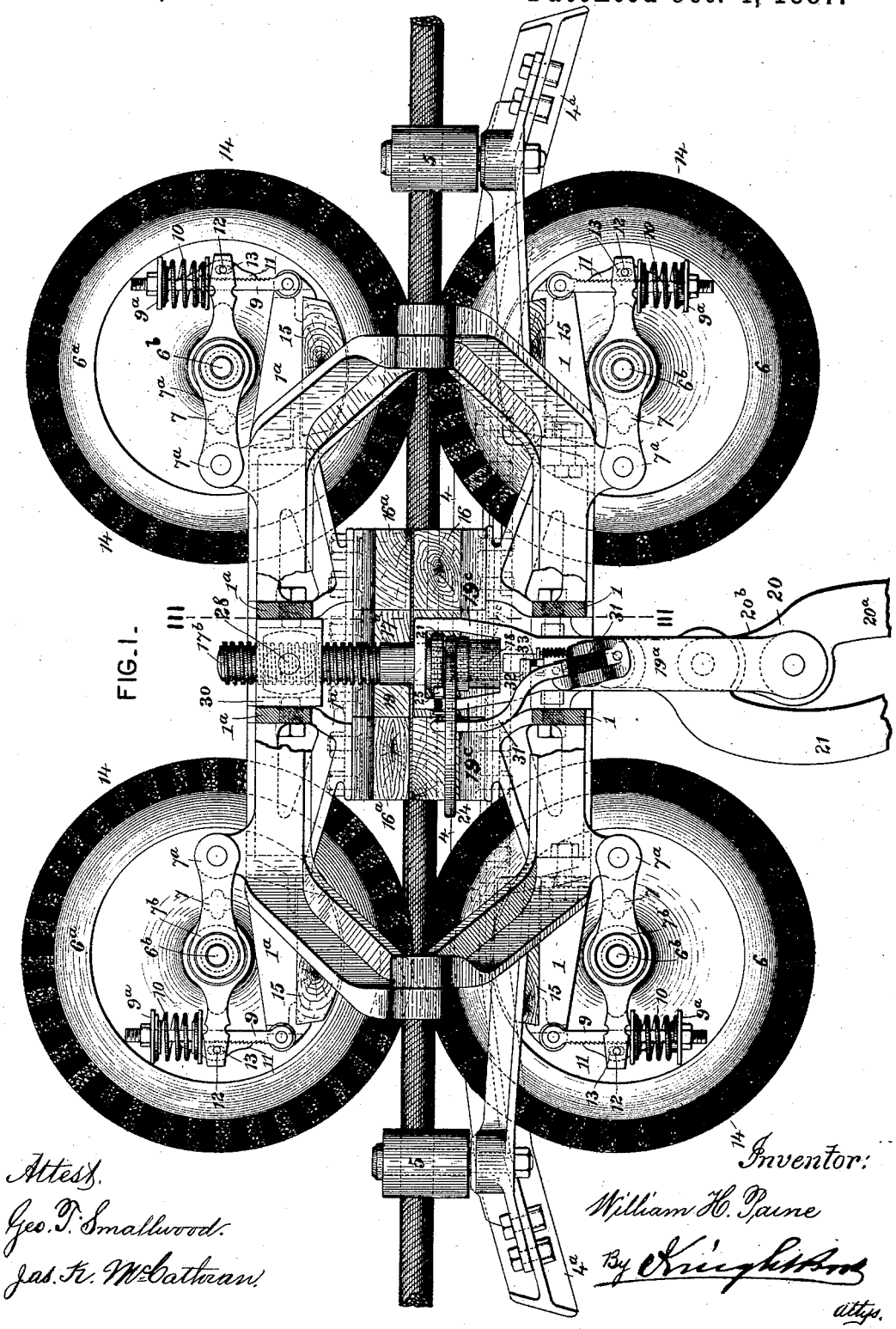
Attest.
Geo. T. Smallwood.
Jas. K. McCathran.
Inventor:
William H. Paine
By Knight Bros.
attys.

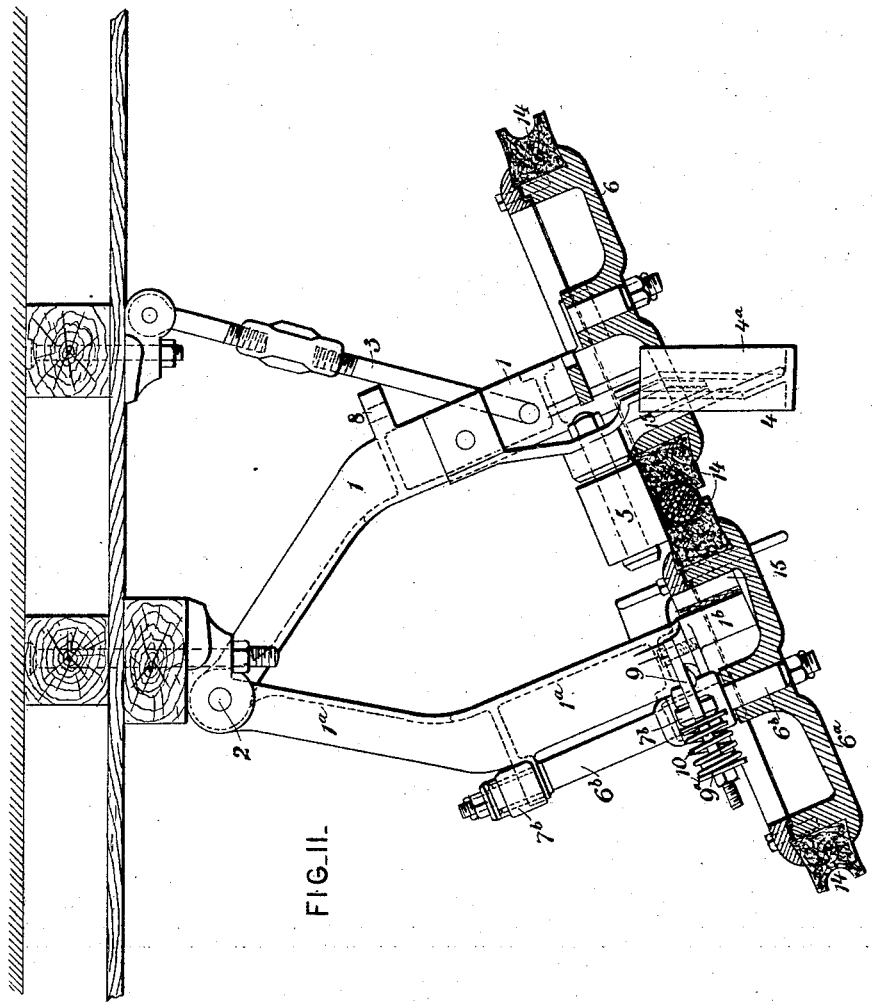

(No Model.) 5 Sheets—Sheet 3.
W. H. PAINE.
GRIPPER FOR CABLE RAILWAYS.
No. 371,095. Patented Oct. 4, 1887.
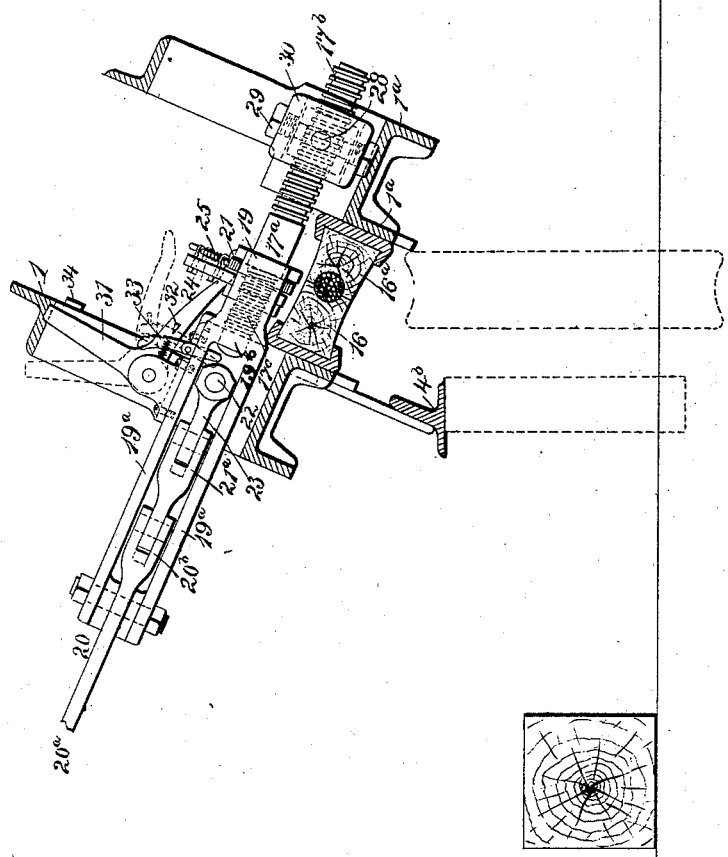
Attest
Geo. T. Smallwood
Jas. K. McCathran
Inventor
William H. Paine
By Knight Bros attys

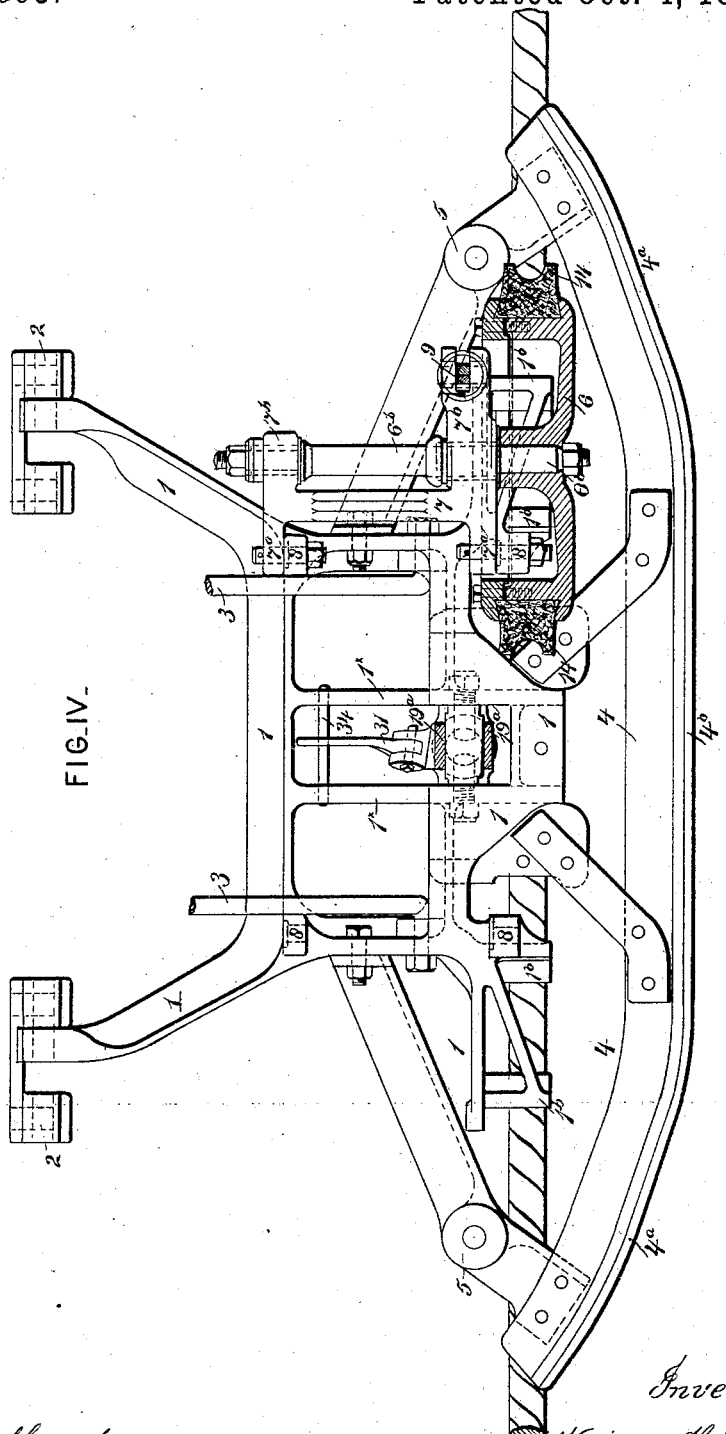

(No Model.) 5 Sheets—Sheet 5.
W. H. PAINE.
GRIPPER FOR CABLE RAILWAYS.
No. 371,095. Patented Oct. 4, 1887.
FIG. V.
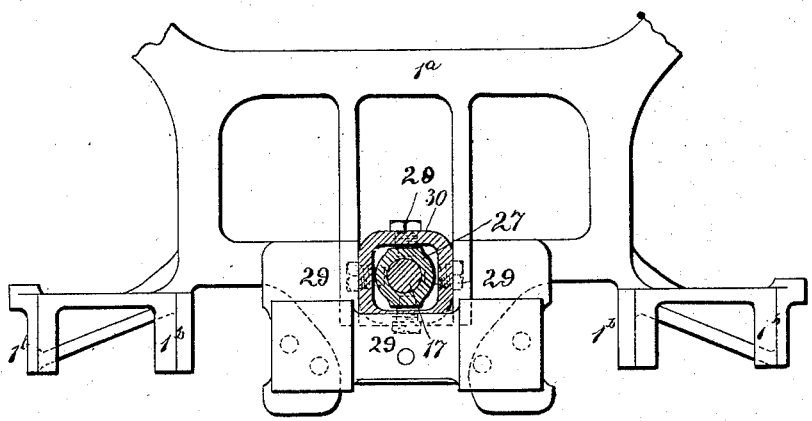
FIG. VI.
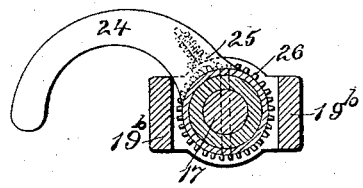
Attest.
Geo. T. Smallwood.
Jas. H. McCathran.
Inventor:
William H. Paine
By Knight Bros
attys.

United States Patent Office.

WILLIAM H. PAINE, OF BROOKLYN, NEW YORK, ASSIGNOR TO THE NATIONAL CABLE RAILWAY COMPANY, OF NEW YORK.

GRIPPER FOR CABLE RAILWAYS.

SPECIFICATION forming part of Letters Patent No. 371,095, dated October 4, 1887.

Application filed April 30, 1885. Serial No. 164,001. (No model.)

*To all whom it may concern:*

Be it known that I, WILLIAM HENRY PAINE, a citizen of the United States, residing at Brooklyn, in the State of New York, have invented a new and useful Improvement in Grippers for Cable Railways, of which the following is a specification, reference being had to the accompanying drawings, forming a part thereof, and in which—

Figure I is a view of the upper side of the grip, looking in the direction of the arrow 1, Fig. II, showing the jaws closed. Fig. II is an end view of the grip in which some of the parts are omitted, those shown being in elevation or vertical transverse section. Fig. III is a vertical transverse section on the line III III, Fig. I, showing the relative positions of the grip, the track-rails, and the carrying-sheaves for the cable. Fig. IV is a view, looking from the outside of the main frame, of one of the jaws of the grip, showing some of the parts attached thereto and in elevation or vertical section. Fig. V is an elevation of the opposite side of said frame. Fig. VI is a detail view of a portion of the take-up mechanism.

The grip is of the kind known as "combined roller and positive grip," in which, as is well understood, the roller is brought into action slightly in advance of the positive grip. Each of the jaws of the grip is constructed upon a frame of malleable cast-steel or other suitable material, which depends from the floor of the car. Said frames are hung from a common center; but one of said frames is held from swinging in and out of the position in which it would naturally hang by an adjustable connection with the floor of the car. By this means to grasp the cable the swinging jaw must be moved up to the stationary jaw, and in so doing it passes the position in which it would naturally hang; hence when the pressure which holds the jaws of the grip closed is removed gravity will cause the swinging jaw to fall away from the fixed jaw and permit the cable to drop. Gravity is thus utilized for opening the jaws of the grip. The fixed jaw is provided with a depression-bar or guard-bar, which extends from end to end of the grip, (and farther, if desired,) and has its extremities upturned for engaging an anti-friction sheave and depressing it altogether with the cable-supporting sheave, as described in my application No. 162,701, filed April 18, 1885. This fixed jaw is also provided at each end with a horizontally-journaled sheave or roller, which sheaves project over the cable and occupy such positions relatively to the grip-shoes that the cable cannot rise between the jaws of the grip to a plane above said shoes. Each jaw of the grip is provided about its mid-length with a rigid grip-shoe.

The roller-grip consists of four sheaves journaled at the respective ends of the two frames of the grip in such a manner that the pair of rollers at each end of the grip will bear upon opposite sides of the cable. These gripping-sheaves are of the same construction as those shown and described in Letters Patent No. 296,605, granted to me April 8, 1884, and the brake-shoes for retarding their rotation are applied in the same manner. These sheaves are not journaled directly in the frames of the grip, but each is carried by a swinging frame, a description of one of which will suffice, all being alike. The swinging frame is hinged vertically near the end of the grip-frame, and extends to or beyond said end, the extremities of said swinging frame and grip-frame being connected as follows: A rod is pivotally connected at one extremity to the end of the main frame, passed through an eye in the swinging frame, and provided at its other extremity with a screw-thread, a washer, and a nut, between which washer and the swinging frame is interposed a compression-spring. One side of this rod is provided with ratchet-teeth, which are engaged by corresponding teeth on the face of a dog, which is placed and has a limited sliding motion within the eye in the swinging frame. The teeth are for taking up wear in the surface of the shoe used for retarding the rotation of the grip-sheaves, as will be hereinafter described. Excluding for the time being the question of wear, this rod and dog may be considered practically as one member. The dog is provided with a longitudinal slot, through which passes a pin, which holds it to place, and also limits its motion. The compression-spring, before referred to, will tend to draw the rod and dog through the eye in the swinging frame, and does do so to the extent permitted by the slot and pin. Therefore the pressure of the carrying-sheaves upon the cable, which is produced by the coil-spring, is exerted upon the outer end of the swinging frame, and is transmitted through said frame to the journals of the sheave, and thence to said sheave and the cable. The pressure thus produced is a yielding one, and serves to hold the carrying-sheave in contact with the cable after the said cable has been released by the grip, thereby holding said cable within the grip while the car is at rest. To drop the cable, the grip must be opened still wider, the movable jaw being allowed to swing completely away from the fixed one, as already described. The wearing away of the face of the brake-shoe of the grip-rollers is compensated for by the toothed dog and the teeth on the rod. These teeth are so arranged as to prevent the compression-spring from drawing the rod and dog any farther than is permitted by the slot in the latter, whereas, should the surface of the brake-shoe be so worn as not to bear upon the flange of the roller before the dog reaches the extremity of its motion, said dog being held against further movement, the rod will be drawn through farther, thereby bringing other teeth into mesh. The wearing away of the faces of the shoes of the positive grip is compensated for by devices hereinafter fully described, operating as follows: Upon the closing of the grip, if the jaws approach beyond a certain distance asunder, a bell-crank lever is rocked on its fulcrum. The horizontal arm of this lever is held normally elevated by a dog, and is only liberated when the said dog is disturbed by the movement of the jaws upon their approach within a certain distance asunder, as above mentioned. This horizontal arm engages with a winding mechanism, whereby the connection between the jaws of the grip is shortened when said lever is oscillated. The other arm of this lever projects vertically and is engaged by the frame of the grip-jaw when the grip is opened. The lever is thereby rocked, and when returned to its normal position is held by the dog until again liberated in the same manner. The levers for operating the jaws of the grip are substantially the same as those described in the patent above referred to—i. e., toggle-levers drawn together by an endless wire rope or chain passed around a drum at each end of the car and having its oppositely-moving parts connected to the extremities of the respective levers.

In the drawings, 1 1$^a$ represent the malleable cast-steel frames, upon which the respective jaws of the grip are constructed. These frames depend from the floor of the car, being pivoted upon one common center, as at 2. As will be seen upon reference to Fig. II, this center, from which the jaws of the grip depend, is considerably to one side of the vertical plane of the cable, so that if unrestrained the tendency of the said jaws would be to hang with their gripping-surfaces in the same vertical plane, thereby tending always to close by gravity and requiring some mechanism for opening them. To avoid the necessity for this additional mechanism, and, furthermore, to utilize gravity for opening the jaws, one of them—1, for example—is drawn from the position in which it would naturally hang and held against movement in either direction (thereby becoming a rigid jaw) by an adjustable link, 3, or other suitable connection with the floor of the car. By this link the jaw 1 is held in such position that its gripping-surface will be contiguous to the side of the cable opposite to the jaw 1$^a$, while the latter will swing unrestrained from the point 2. These parts should be so located and adjusted that when the center of gravity of the jaw 1$^a$ falls directly beneath the point 2 the cable will drop away from contact with the gripping-surface of the jaw 1, and the gripping-surface of the jaw 1$^a$ will be out of contact with the cable. Throughout this specification and the claims whenever it becomes necessary to refer to these jaws 1 and 1$^a$ they will be called the "rigid" or "fixed" and "movable" or "swinging" jaws, respectively.

Affixed to the rigid jaw 1 is a guard-bar, 4, which extends from end to end of the grip in a plane parallel to but a little to one side of the cable, as represented in Fig. II. This guard-bar is provided at each end with an inclined or upturned portion, 4$^a$, the foremost one of which upturned portions, according to the direction in which the car is moving, comes in contact with a loose pulley located by the side of the depressible cable-supporting sheave, and thereby depresses said pulley and sheave, the horizontal portion 4$^b$ of said guard-bar serving to hold them in their depressed position while the grip is passing to prevent the latter from being injured. After the grip has passed the supporting-sheave, the latter is permitted to resume its normal position gradually and without any sudden shock by the incline 4$^a$ at the rear end of the guard-bar 4, all of which is fully described in my application above referred to.

5 is a spool or roller, one of which is attached to each end of the rigid jaw 1, said spool being placed over the cable and in such position relatively to the gripping-surface of the rigid jaw as to prevent said cable from rising above said surface.

The roller-grip consists of two pairs of rollers, 6 6$^a$ 6 6$^a$, one roller of each pair being carried at the respective ends of the frame 1 1$^a$. The rollers of each pair may bear against the cable at directly opposite points, or one may be a little in advance of the other, as desired. These rollers are not journaled directly to the main frame, but each one is journaled in an independently-swinging frame, which is connected to the main frame in substantially the following manner. The means for connecting all of these rollers being the same, it will be sufficient to describe one of them:

7 is the swinging frame, which is of L shape, as shown in Fig. IV. The rearwardly-projecting arms 7$^a$ of this frame are provided with vertical perforations, which receive bolts passed through similar perforations in lugs 8, projecting from the main frame. On these bolts the frames 7 have a limited swinging motion in a horizontal plane. The forwardly-projecting arms $7^b$ of the frame 7 are perforated and receive the spindle $6^b$ of the roller 6, as shown more clearly in Fig. IV.

9 is a rod which is hinged to the extremity of the main frame, and, passing through an eye formed in the extremity of the longer or lower arm, $7^b$, of the frame 7, is screw-threaded and receives a nut and washer, $9^a$. Between this washer and the free end of the swinging frame 7 is interposed a compression spring, 10.

11 is a toothed dog, which is placed within the eye in the arm $7^b$ of the swinging frame 7 and engages with corresponding ratchet-teeth formed on the contiguous side of the rod 9. This dog is held in place by a pin, 12, which is fast in the arm $7^b$ and passes through an elongated slot, 13, formed through the dog, as represented in dotted lines in Fig. I. These constitute the means for holding the carrying-sheaves 6 $6^a$ in contact with the cable and operate as follows: When the jaws are closed, the rod 9 will bring the outer extremity of the slot 13 in the dog 11 in contact with the pin 12 and place the spring 10 under compression. As the jaws are opened, the rod 9 will slip through the eye in the arm $7^b$ and carry the dog 11 with it. Until the dog passes sufficiently far to bring the inner extremity of the slot 13 into contact with the pin 12 the sheaves will be held in contact with the cable by the expansive force exerted by the springs 10 and transmitted to said sheaves through the swinging frames 7. As soon, however, as the inner extremities of the slots 13 come in contact with the pins 12, any further relative movement of the main frames 1 $1^a$ from each other will draw the rollers away from the cable and permit it to drop. The sheaves are of the form shown more clearly in Figs. II and IV, and have their peripheries lined with yielding dies 14, made up of alternate strips of leather and rubber or other suitable yielding material.

15 are brakes-shoes for retarding the rotation of these rollers, which are secured directly to lugs $1^b$, projecting downwardly from the main frame.

16 $16^a$ are the dies of the positive grip, which are secured directly to the main frames 1 and $1^a$, respectively, and are preferably arranged at about the center of said frames, as shown more clearly in Fig. I.

In operation, the shoes 15, which retard the rotation of the sheaves 6 $6^a$, will come to their bearings upon said sheaves a little before the dies 16 $16^a$ of the positive grip come in contact with the cable. Pressure being continued and the limit of elasticity of the dies 14 having been reached, the dies 16 $16^a$ of the positive grip will come in contact with the cable and grip it positively, thereby compelling the car to travel at the same velocity as said cable.

17 is a bolt, which is cylindrical at an intermediate point, as at $17^a$, and screw-threaded at both ends. The end $17^b$ of this bolt is screwed into the jaw $1^a$, or a part fixed thereto, as hereinafter described, while the end $17^c$ is provided with a nut, 18, which forms a bearing for a stirrup, 19, which is of the shape represented in Figs. I and III. One extremity of this stirrup is provided with a circular aperture fitting upon the cylindrical portion $17^a$ of the bolt, while the other end terminates in two parallel arms, $19^a$, lying, preferably, in horizontal planes, as shown in Fig. III. These horizontal arms $19^a$ of the stirrup do not extend to the apertured extremity thereof, but terminate some distance therefrom in a crosshead, $19^b$, and from this point said stirrup is continued in the form of two arms or straps, $19^c$, placed in vertical planes, so as to form a vertical aperture near the extremity of the stirrup, as shown in Figs. I and VI. Between the extremities of the arms $19^a$ is pivoted a lever, 20, having a long arm, $20^a$, which is connected to the endless rope or chain, by means of which the grip is operated from the end platforms of the car, as described in my patent above referred to, and a short arm, $20^b$, which is pivoted near the end of a similar lever, 21, the shorter arm, $21^a$, of which is fulcrumed to the frame 1 through the medium of a bolt, 22, and an arm or step, 23, held thereby. This constitutes the means for opening and closing the jaws of the grip, the operation of which is substantially as described in my aforesaid patent.

24 is a lever which is fulcrumed at its extremity upon the bolt 17, as shown in Fig. VI, and held against longitudinal movement thereon by means of the nut 18 and a collar, 26, keyed securely to said bolt within the vertical aperture of the stirrup 19, as shown more clearly in Figs. I and VI. This lever is capable of a free oscillatory motion, and is provided with a spring-actuated or other pawl, 25, which engages with ratchet-teeth formed upon the periphery of the collar 26. When the lever 24 is elevated, the pawl 25 engages with the ratchet 26, and thereby turns the bolt 17, causing it to be screwed farther into its seat in the opposite jaw, $1^a$, which draws the two jaws closer together for compensating for wear in the faces of the gripping-dies. This bolt is secured to the jaw $1^a$ by means of a nut, 27, which may be of any desired shape, and held against rotation by any suitable means. For example, it may be provided with radial holes 28, for the reception of the ends of bolts 29, tapped into a part of the frame or a collar, 30, attached thereto; or it may be of quadrangular, polygonal, or other non-circular shape, and held against rotation by the collar 30, correspondingly formed. The bolts 29, or some other means, will, however, be necessary in order to hold the nut to its place within the collar. When the dies of the grip have been worn away so as to be of no further use, the bolt 17 will have been driven so far through the nut 27 that the latter will be close up to the cylindrical portion 17ª, whereas when the dies are new it is necessary that said nut should be near the outer extremity of said bolt. The mechanism last described constitutes a simple and effective means whereby the nut may be quickly turned out to its proper place on the bolt whenever the old dies are to be replaced by new ones. This is accomplished by first retracting the bolts 29, then sliding the bolt 17 endwise until the nut 27 comes outside of the collar 30, then turning said nut by hand to the desired position, and then replacing it within the collar and screwing in the bolts 29.

31 is a bell-crank lever fulcrumed upon the top of the stirrup 19 and having one of its arms projecting vertically and the other horizontally or thereabout, its extremity being at all times beneath the lever 24. The horizontal arm of this lever is provided with a tooth or lug, 32, which is engaged by a toothed dog, 33, also pivoted to the stirrup 19, and held out into engagement with said lug by means of a spring. This dog 33 holds the horizontal arm of the lever 31 normally elevated or in the position shown in dotted lines in Fig. III.

34 is a bar secured between the two upright portions 1ˣ of the frame 1 for the purpose of rocking the bell-crank lever 31 in the manner presently to be described. The bell-crank lever 31 and dog 33 being in the position shown in dotted lines in Fig. III, which is their normal position, the operation of the device is as follows: It will be seen that in closing the jaws the more the faces of the dies are worn away the closer the heel or lower end of the dog 33 will come to the bolt 22, said parts being secured to the said jaws 1ª and 1, respectively; hence when they are so worn that the heel of said dog comes into contact with said bolt, or other trip secured in the same relation, the top end thereof will be moved away from engagement with the lug or tooth 32, thereby permitting the horizontal arm of the bell-crank lever to fall by gravity to the position shown in full lines. This movement takes place on the closing of the jaws. When the levers 20 21 are opened, the jaw 1ª will swing away from the jaw 1, (the latter being held immovably, as described,) carrying with it the stirrup 19, and consequently the bell-crank lever 31 and other parts which are secured to it. This relative movement between the two jaws brings the vertical arm of the bell-crank lever 31 into contact with the bar 34, whereby said lever is rocked, causing the horizontal arm thereof to rise, and by engaging with the under side of the lever 24 elevate it and turn the bolt 17, as already described. This brings the parts 31 32 into the position shown in dotted lines, where they are held by the dog 33 until the latter is again tripped by the approach of the jaws within a certain distance asunder.

Having thus described my invention, the following is what I claim as new therein and desire to secure by Letters Patent:

1. The combination, with the positive grip, of a roller-grip consisting of rollers arranged in pairs upon opposite sides of the cable, so as to embrace it between their peripheries, and braking devices for retarding the rotation of said rollers, substantially as set forth.

2. The combination, with a positive grip, of a roller-grip consisting of rollers arranged in pairs upon opposite sides of the cable, braking devices adapted to engage said rollers when moved toward the cable, and mechanism for bringing said braking devices to bear upon the rollers, whereby the latter are made to bite the cable and their rotation simultaneously checked, substantially as set forth.

3. The combination, with a roller-grip consisting of rollers arranged in pairs upon opposite sides of the cable and braking devices for simultaneously pressing them into contact with the cable and retarding their rotation, of a positive grip adapted to be moved to and from the cable independently of the roller grip for the purpose set forth.

4. The combination, with the dies of a positive grip and the rollers of a roller-grip, said dies and rollers being capable of limited movement independently of each other, of brake-shoes for retarding the rotation of said rollers, and a pair of frames to which the opposing members of both the grips are respectively secured, for the purpose set forth.

5. In a grip, the combination of a movable jaw and a hinge from which it depends, located to one side of the vertical plane of the cable, whereby the said jaw is adapted to swing away from the cable by gravity, as explained.

6. The combination, with a jaw held in an inclined position, of a movable jaw swinging in the plane of the fixed jaw, substantially as set forth.

7. The combination, with the two jaws of a grip suspended from a common center and to one side of the vertical plane of the cable, of a link or other connection for holding one of said jaws with its dies or gripping-surface contiguous to the side of the cable opposite to the common center from which said jaws are suspended, as explained.

8. The combination, with the fixed or rigid jaw of a grip, of a guard-bar extending along the under side thereof from end to end and having upturned or inclined end, substantially as and for the purpose set forth.

9. The combination, with a pair of frames, of the dies constituting the positive grip secured to the respective frames at an intermediate point, and the roller-grip consisting of rollers for embracing the cable, and braking devices for retarding the rotation of said rollers secured to the extremities of said frames, substantially as and for the purpose set forth.

10. The combination of a swinging frame hinged to the main frame of a grip, a sheave or roller journaled to and carried by said swinging frame, and a spring for holding the sheaves of the two jaws in contact with the cable after the cable has been released by the grip, substantially as set forth.

11. The combination, with the jaws of a grip, of a pair of sheaves or rollers carried by the respective jaws, springs for holding said sheaves in contact with the cable when the cable is released by the gripping-dies, and brake-shoes for retarding the rotation of said sheaves or rollers as the jaws of the grip are closed, substantially as set forth.

12. The combination of a swinging frame hinged to the main grip-frame and having the cable-supporting roller journaled therein, a rod hinged to the main frame and extending outward past the swinging frame, a flange or washer on said rod, and a spring interposed between said washer and the swinging frame, substantially as set forth.

13. The combination of a swinging frame hinged to the main grip-frame and having the cable-supporting sheave or roller journaled therein, a spring incorporated in the connection between the main frame and the swinging frame, and a screw-nut for adjusting the tension of the said spring, substantially as set forth.

14. The combination, with the main frame of the grip, of a swinging roller-supporting frame hinged thereto, a rod connecting said frames, a spring surrounding said rod and serving to hold the sheaves in contact with the cable when the jaws are open, and a stop for limiting the movement of the sheave by said spring, as set forth.

15. The combination, with the jaws of a grip, of swinging frames hinged to the main frames and having the cable-supporting sheaves or rollers journaled therein, toothed rods hinged to the main frame and projecting through slots in the swinging frames, toothed dogs secured to the swinging frames by means of longitudinal slots and pins passing therethrough, springs exerting a strain in opposite directions against said frames, and shoes secured to the main frames for retarding the rotation of the sheaves, substantially as and for the purposes set forth.

16. The combination, with the main frame, of the swinging frame 7, hinged thereto, the toothed rod 9, attached to the main frame, the dog 11, having longitudinal slot 13 and teeth engaging with those on the rod 9, the pin 12, secured in the frame 7 and extending through the slot 13, the spring 10, exerting a force upon the main frame and the swinging frame in opposite directions, and the shoe 15, secured to the main frame, substantially as and for the purpose set forth.

17. The combination, with the two jaws of a grip having a connection between them, of a take-up mechanism operated by the movement of the said jaws relatively to each other for shortening said connection, and thereby compensating for the wearing away of the gripping-dies, as explained.

18. The combination, with the two jaws of a grip connected by a screw-bolt, of a lever rocked or oscillated by a relative movement between said jaws for turning said screw-bolt, as and for the purpose set forth.

19. The combination, with the two jaws of a grip, a screw-bolt connecting them, and a circular ratchet secured to said bolt, of an oscillating lever fulcrumed upon said bolt and having a pawl for engaging with said ratchet, and a lever rocked by a relative movement between the said jaws for moving said oscillating lever, substantially as set forth.

20. The combination, with the two jaws of a grip having a connection between them and an automatic take-up, of a dog for holding said take-up in an inoperative position until liberated by the approach of the jaws within a given distance asunder, substantially as set forth.

21. The combination, with the two jaws of a grip having a connection between them, of an automatic take-up operated by the opening of the jaws, and a dog for holding said take-up normally in an inoperative position, tripped by the closing together of the jaws for permitting the take-up to act, substantially as set forth.

22. The combination, with the two jaws of a grip and a connection between them, of a screw-bolt incorporated in the said connection, a circular ratchet secured to said bolt, an oscillating lever fulcrumed upon said bolt and provided with a pawl for engagement with said ratchet, and a bell-crank lever fulcrumed to a part of said connection and engaging with said oscillating lever, as described, rocked by a relative movement between the jaws, substantially as set forth.

23. The combination, with the two jaws of a grip, of a screw-bolt incorporated in the connection between them and a nut through which said bolt screws, removably secured to one of the jaws and held against rotation, substantially as set forth.

24. The combination, with the two jaws of a grip, of a screw-bolt incorporated in the connection between them, a nut through which said bolt screws, a collar within which said nut is removably fitted, and bolts for holding said nut in place in said collar, substantially as set forth.

25. The combination of the fixed jaw of a grip, the swinging frame or hanger having a jaw secured thereto constituting the movable jaw, the connection between said jaws, and the operating toggle-arms, substantially as set forth.

26. The combination, with the jaw of a grip having recessed faces, as described, of rubber or similar material inserted therein and forming a gripping-surface, substantially as set forth.

27. The combination, with the jaw of a grip, of a die formed of strips or blocks of rubber and some other material, substantially as set forth.

28. The combination, with the jaw of a grip, of a die formed of alternate strips of rubber and leather, substantially as set forth.

29. The combination, with the two jaws of a grip, of a take-up operated by a relative movement of the jaws for compensating for the wearing away of the gripping-surfaces.

30. The combination, with the two jaws of a grip and an automatic take-up operated by a relative movement of the jaws, of a dog for holding said take-up in an inoperative position until liberated by the approach of the jaws within a given distance asunder, substantially as set forth.

WILLIAM H. PAINE.

Witnesses:
CHARLES C. BULKLEY,
HERBERT KNIGHT.